(12) United States Patent
Kamperschroer (10) Patent No.: US 6,532,361 B1
(45) Date of Patent: Mar. 11, 2003

(54) METHOD FOR CONTROLLING THE ACCESS AUTHORIZATIONS OF TELECOMMUNICATION DEVICES AT COOPERATION STATIONS

(75) Inventor: Erich Kamperschroer, Hamminkeln (DE)

(73) Assignee: Siemens AG, Munich (DE)

( * ) Notice: Subject to any disclaimer, the term of this patent is extended or adjusted under 35 U.S.C. 154(b) by 0 days.

(21) Appl. No.: 09/508,931
(22) PCT Filed: Aug. 27, 1998
(86) PCT No.: PCT/DE98/02529
§ 371 (c)(1),
(2), (4) Date: Mar. 15, 2000
(87) PCT Pub. No.: WO99/14962
PCT Pub. Date: Mar. 25, 1999

(30) Foreign Application Priority Data

Sep. 15, 1997 (DE) .......................... 197 40 560

(51) Int. Cl.⁷ .............................. H04Q 7/20
(52) U.S. Cl. .............. 455/411; 455/403; 455/410; 455/462; 455/463; 455/554; 455/555
(58) Field of Search ..................... 455/403, 422, 455/410, 411, 435, 462, 463, 550, 465, 554, 555; 379/156, 37, 189, 161, 168, 184, 194; 381/231, 25, 34

(56) References Cited

U.S. PATENT DOCUMENTS 5,239,294 A * 8/1993 Flanders et al. ........... 340/5.54
5,325,419 A * 6/1994 Connolly et al. .......... 380/247
5,329,573 A * 7/1994 Chang et al. .............. 380/248
5,455,863 A * 10/1995 Brown et al. .............. 380/247
6,360,091 B1 * 3/2002 Schellinger et al. ........ 455/403

FOREIGN PATENT DOCUMENTS

WO   WO 94/10764   5/1994
WO   WO 95/31080   11/1995

OTHER PUBLICATIONS

Integrated Services Digital Network (ISDN); Signalling application for the alpha intrface of Cordless Terminal Mobility (CTM); basic call and mobility management Digital Subscriber Signalling System No. One (DSS1) protocol Part 1: Protocol specification pp. 1–64.

* cited by examiner

Primary Examiner—Thanh Cong Le
Assistant Examiner—Pablo Tran
(74) Attorney, Agent, or Firm—Bell, Boyd & Lloyd LLC (57) ABSTRACT

In order, in telecommunications systems having wireless telecommunication between telecommunication devices and cooperating stations, to be able to at least temporarily use cooperating stations with private access authorization (residential cooperating stations) for telecommunication devices as cooperating stations with public access authorization for telecommunication devices, the residential cooperating stations that are connectible to telecommunication networks via network interfaces fetch information that is present in the telecommunication networks and indicate the access authorizations via the interfaces and forward these to the telecommunication devices.

13 Claims, 6 Drawing Sheets

Figure 1:
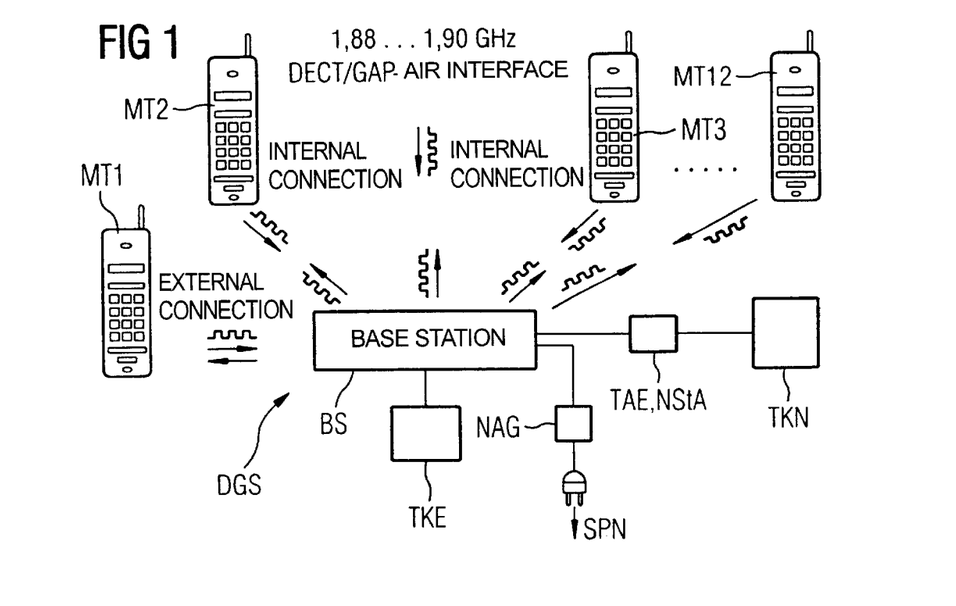
FIG. 1 shows an illustration of a setup at a DECT/GAP base station according to the DECT/GAP standard.

FIG 7 ns with the illustration in FIG. 1. The GAP
standard is a subset of the DECT standard that has the job
of assuring the interoperability of the DECT air interface for
telephone applications.

METHOD FOR CONTROLLING THE ACCESS AUTHORIZATIONS OF TELECOMMUNICATION DEVICES AT COOPERATION STATIONS

BACKGROUND OF THE INVENTION

1. Field of the Invention

The present invention relates to a method for controlling access authorizations of telecommunication devices at cooperating stations in telecommunication systems with wireless telecommunication between the telecommunication devices and the cooperating stations.

2. Description of the Prior Art

In message systems with a message transmission link between a message source and a message sink, transmission and reception devices are employed for processing and transmission of the message wherein, 1) the message processing and message transmission can occur in a privileged transmission direction (simplex mode) or in both transmission directions (duplex mode),
2) and message processing is analog or digital,
3) the message transmission via the long-distance transmission link either is wire-bound or occurs wirelessly on the basis of various message transmission methods FDMA (Frequency Division Multiple Access) and/or CDMA (Code Division Multiple Access)—for example according to radio standards such as DECT, GSM, WACS or PACS, IS-54, PHS, PDC, etc. [see IEEE Communications Magazine, January 1995, pages 50 through 57; D. D. Falconer et al., "Time Division Multiple Access Methods for Wireless Personal Communication"].

"Message" is a higher-ranking term that stands both for the signification (information) and for the physical representation (signal). Despite the same signification of a message (i.e. a therefor a same information), different signal forms can occur. Thus, for example, a message relating to a subject matter can be transmitted:

(1) in a form of an image;
(2) as a spoken word;
(3) as a written word;
(4) as an encrypted word or image.

The transmission mode according to (1) . . . (3) is, thereby a normally characterized by continuous (analog) signals, whereas discontinuous signals (for example a, pulses, digital signals, etc) usually arise given the transmission mode according to (4).

Telecommunication systems in the above-defined field are, for example, DECT systems [Digital Enhanced (previously: European) Cordless Telecommunication; see (1): Nachrichtentechnik Elektronik 42 (1992) January/February No. 1, Berlin, DE; U. Pilger, "Struktur des DECT-Standards" pages 23 through 29 in conjunction with the ETSI Publication ETS 300175-1 . . . 9, October 1992; (2): Telcom Report 16 (1993), No. 1, J. H. Koch, "Digitaler Komfort für schnurlose Telekommunikation—DECT-Standard eröffnet neue Nutzungsgebiete", pages 26 and 27; (3): tec 2/93—the technical magazine of Ascom, "Wege zur universellen mobilen Telekommunikation", pages 35 through 42; (4): Philips Telecommunication Review, Vol. 49, No. 3, September 1991, R. J. Mulder, "DECT, a universal cordless access system"; (5) WO 93/21719 (FIGS. 1 through 3 with appertaining description)] or GAP systems (Generic Access Profile; see ETSI Publication ETS 300444, December 1995, ETSI, FR) that, for example, can be constructed according to the illustration in FIG. 1. The GAP standard is a subset of the DECT standard that has the job of assuring the interoperability of the DECT air interface for telephone applications.

According to the DECT/GAP standard, it is possible, in accordance with the illustration in FIG. 1, to set up at a DECT/GAP base station ES a maximum of 12 connections according to the TDMA/FDMA/TDD method (Time Division Multiple Access/Frequency Division Multiple Access/Time Division Duplex) in parallel to DECT/GAP mobile parts MT1 . . . MT12 over a DECT/GAP air interface configured for the frequency range between 1.88 and 1.90 GHz. The number 12 results from the number "k" of time slots or telecommunications channels k=12) available for the duplex mode of a DECT/GAP system. The connections here may be internal and/or external. When there is an internal connection, two mobile parts registered at the base station ES, for example the mobile part MT2 and the mobile part MT3, can communicate with one another. To set up an external connection, the base station ES is connected to a telecommunications network TKN, for example, in line-bound form via a telecommunications connection unit TAE and/or a private branch exchange system NStA with a line-bound telecommunications network or, in accordance with WO 95/05040, in wireless form as a repeater station with a superordinate telecommunications network. When there is an external connection, it is possible to use a mobile part, for example the mobile part MT1, to communicate with a subscriber in the telecommunications network TKN via the base station BS, the telecommunications connection unit TAE or a private branch exchange system NStA. If the base station BS has—as in the case of the Gigaset 951 (Siemens cordless telephone, cf. Telcom report 16, (1993) Issue 1, pages 26 and 27)—only one connection to a telecommunications connection unit TAE and/or to the private branch exchange system NStA, only one external connection can be set up. If the base station ES has—as in a case of the Gigaset 952 (Siemens cordless telephone; cf. Telcom report 16, (1993), issue 1, pages 26 and 27)—two connections to a telecommunications network TKN, a further external connection, in addition to the external connection to the mobile part MT1, is possible from a line-bound telecommunications terminal TKE which is connected to the base station BS. In this context, it is also possible for a second mobile part, for example the mobile part MT12, to use the second port for an external connection, instead of telecommunications terminal TKE. While the mobile parts MT1 . . . MT12 are operated with a battery or an accumulator, the base station BS which is designed as a cordless small-scale exchange is connected to a voltage network SPN via a mains connection unit NAG.

Figure 2:
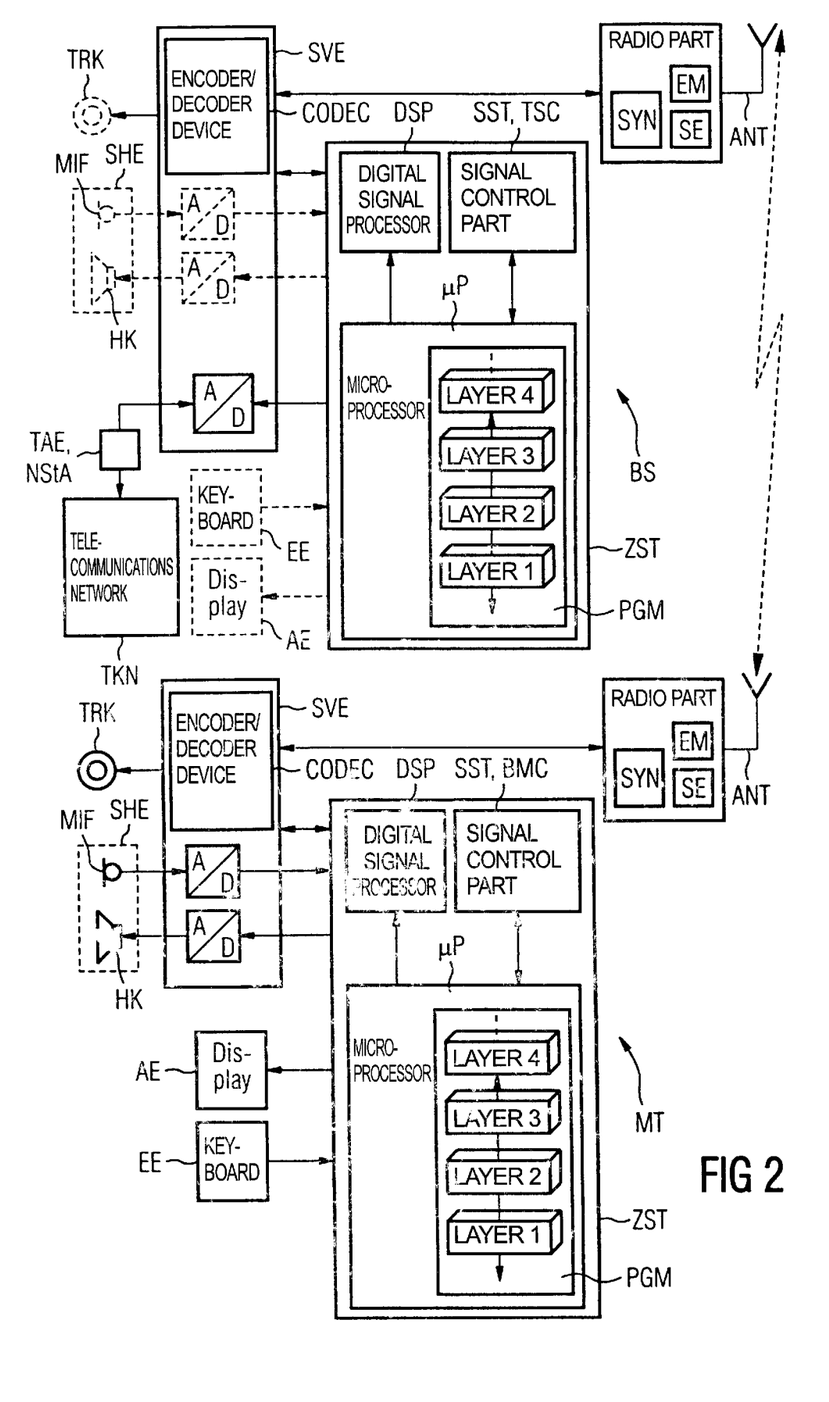
FIG. 2 shows an illustration of the basic circuit design of a base station and a mobile part.

FIG. 2 shows, on the basis of the publication Components 31 (1993), Issue 6, pages 215 to 218; S. Althammer, D. Brückmann: "Hochoptimierte IC's fur DECT-Schnurlostelefone", the basic circuitry design of the base station BS and the mobile part MT. According to the latter, the base station BS and the mobile part MT have a radio component FKT with an antenna ANT which is assigned to transmitting and receiving radio signals, a signal processing device SVE and a central controller ZST which are connected to one another in the illustrated way. The radio component FKT basically contains known devices such as a transmitter SE, a receiver EM and a synthesizer SYN. The signal processing device SVE contains, inter alia, a coding/decoding device CODEC. The central controller ZST has a microprocessor µP both for the base station BS and for the mobile part NT, a program module PGM, set up according to the OSI/ISO layer model [cf. (1): Unterrichtsblätter—Deutsche Telekom, Vol. 48, 2/1995, pages 102 to 111; (2): ETSI publication ETS 300175-1 . . . 9, October 1992], a signal control component SST and a digital signal processor DSP, which are connected to one another in the way illustrated. Of the layers defined in the layer model, only the directly essential first four layers are illustrated for the base station BS and the mobile part MT. The signal control component SST is designed as a Time Switch Controller TSC in the base station BS and as a Burst Mode Controller BMC in the mobile part MT. The essential difference between the two signal control components TSC, BMC is that the base station-specific signal control component TSC additionally assumes switching functions in comparison with the mobile part-specific signal control component BMC.

The principal method of operation of the circuit units specified above is described for example in the publication Components 31 (1993), Issue 6, pages 215 to 218, cited above. The described circuitry design according to FIG. 2 is supplemented in the base station BS and the mobile part MT in accordance with their function in the DECT/GAP system according to FIG. 1 additional function units.

The base station BS is connected to the telecommunications network TKN via the signal processing device SVE and the telecommunications connection unit TAE or the private branch exchange system NStA. As an option, the base station BS also can have a user interface (functional units shown with broken lines in FIG. 2), which includes, for example, an input device EE designed as a keypad, a display device AE designed as a display, a hand-held unit SHE designed as a handset with microphone MIF and earphone HK, as well as a ringer TRK. The mobile part MT has a user interface which is possible with the base station BS as an option and which has the control elements described above, which are associated with this user interface.

Figure 3:
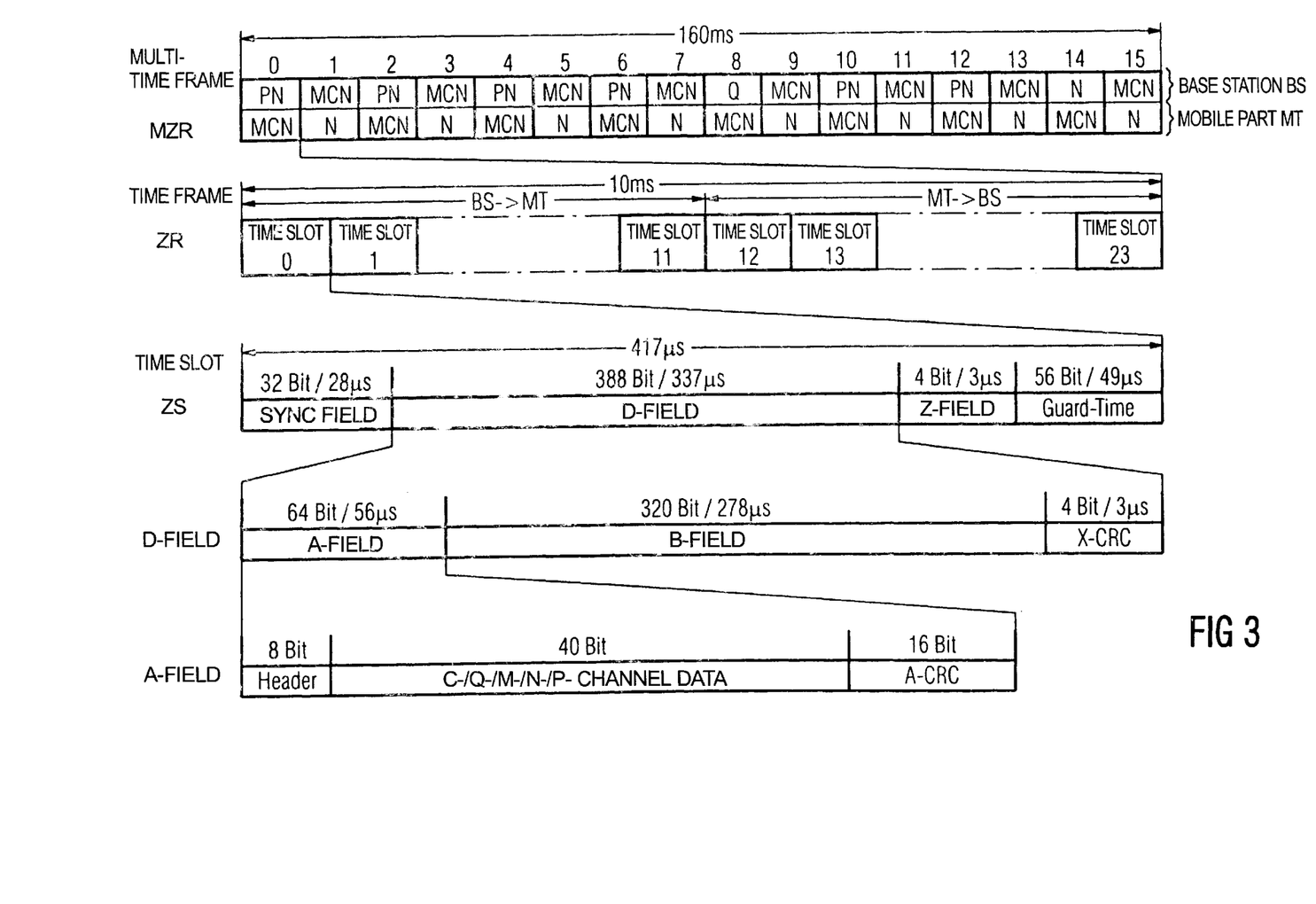
FIG. 3 shows an illustration of the TDMA structure of the DECT/GAP system.

FIG. 3 shows, based on the publication "Nachrichtentechnik Elektronik 42 (1992) January/February, No. 1, Berlin, DE; U. Pilger: "Struktur des DECT-Standards", pages 23 to 29 in conjunction with ETS 300175-1 . . . 9, October 1992", the TDMA structure of the DECT/GAP system DGS. The DECT/GAP system is a hybrid system in terms of the multiple access methods in which, in accordance with the FDMA principle, it is possible to transmit radio telecommunications on ten frequencies in the frequency band between 1.88 and 1.90 GHz from the base station BS to the mobile part MT and from the mobile part MT to the base station BS (Time Division Duplex Mode) according to the TDMA principle in accordance with FIG. 3 in a prescribed time sequence. The time sequence is determined here by a multiple time frame MZR, which occurs every 160 ms and which has 16 time frames ZR, each with a time period of 10 ms. Information which relates to a C-, M-, N- and P-, Q-channel defined in the DECT Standard is transmitted separately to the base station BS and mobile part MT in these time frames ZR. If information for a plurality of these channels is transmitted in one time frame ZR, the transmission takes place according to a priority list where M>C>N and P>N. Each Q-channel of the 16 time frames ZR of the multiple time frame MZR is divided, in turn, into 24 time slots ZS, each of these time slots ZS has a time period of 417 µs, of which 12 time slots ZS (time slots 0 . . . 11) are intended for the transmission direction "base station BS→mobile part NT" and a further 12 time slots ZS (time slots 12 . . . 23) are intended for the transmission direction "mobile part MT→base station BS". In each of these time slots ZS, information with a bit length of 480 bits is transmitted in accordance with the DECT Standard. Of these 480 bits, 32 bits are transmitted as synchronization information in a SYNC field and 388 bits are transmitted as payload information in a D field. The remaining 60 bits are transmitted as additional information in a Z field and as protective information in a "guard time" field. The 388 bits of the D field which are transmitted as useful information are in turn divided into a 64 bit-long A field, a 320 bit-long B field and a 4 bit-long "X-CRC" word. The 64 bit long A field is composed of an 8 bit-long data header, a 40 bit-long data record with data for the C-, Q-, M-, N-, P-channels and a 16 bit-long "A-CRC" word.

Figure 4:
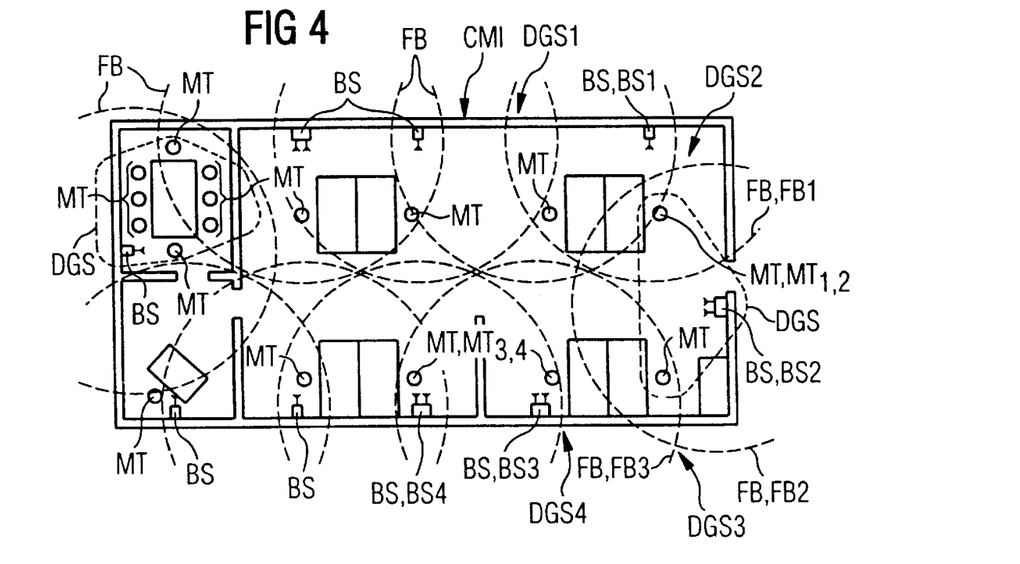
FIG. 4 shows a cellular DECT/GAP multisystem.

FIG. 4 shows, taking the DECT system according to FIG. 1 as a starting point, a cellular DECT/GAP multisystem CMI (Cordless Multicell Integration), in which a number of DECT/GAP systems DGS described above, each with one base station ES and one or more mobile parts MT are present at a given geographical location, for example, concentrated—in a "hot spot" arrangement—in an administration building with large open-plan offices. However, instead of an "enclosed" geographical location, such as the administration building, an "open" geographical location with strategic telecommunication significance, for example squares in large cities with a high traffic volume, a large collection of commercial units and large volumes of people moving, is also possible for the installation of a cellular DECT/GAP multisystem CMI. A number of the base stations BS arranged in the open-plan office are designed here, in contrast to the base stations according to WO 95/10764 shown in FIGS. 1 and 2, as antenna diversity base stations. The concentration of the DECT/GAP systems DGS is so marked here (uninterrupted radio coverage of the geographical location), that individual DECT/GAP systems DGS operate in the same area as a result of the overlapping cellular DECT/GAP radio cells FB.

Depending on the degree of overlapping, the same area may mean here that a) a first base station BS1 of a [. . . ] preferably as first DECT/GAP system DGS1 is arranged in a first radio cell FB1 and a second base station BS2 of a second system DGS2 is arranged in a second radio cell FB2 and can set up telecommunications connections to at least one mobile part $MT_{1,2}$, b) a third base station BS3 of a third DECT/GAP system DGS3 and a fourth base station BS4 of a fourth DECT/GAP system DGS4 are arranged in a common third radio cell FB3 and can set up telecommunications connections to at least one mobile part $MT_{3,4}$.

According to the publication, "Presentation of A. Elberse, M. Barry, G. Fleming on the topic, *"DECT Data Services—DECT in Fixed and Mobile Networks"*, June 17–18, 1996, Hotel Sofitel, Paris, pages 1 through 12 and Summary, the cordless telecommunication scenario shown in FIGS. 1 through 4, wherein DECT mobile parts are connectable via a DECT air interface to a private (residential) DECT base station (FIG. 1) or, respectively, to one or more private or public DECT base stations (FIG. 4), can be expanded to the effect that the DECT mobile parts are connectable via the DECT air interface to private and public DECT base stations.

According to WO 95/05040 (see FIGS. 3 through 8 with the respectively appertaining description) this scenario can, in turn, be expanded in view of a "Universal Mobile Telecommunication System" (UMTS) to the effect that picocell-related cordless telecommunication systems (for example, the previously discussed DECT systems) be linked under CTM points of view (*Cordless Terminal Mobility;* see *ETSI Publications* (1): *"IN Architecture and Functionality for the support of CTM"*, Draft Version 1.10, September 1995; (2): *"Cordless Terminal Mobility (CTM)—Phase 1, Service Description"*, Draft DE/NA-010039, Version 6, Oct. 2, 1995) into a higher-ranking network infrastructure (for example, ISDN, PSTN, GSM and/or satellite networks) for accesses (see *ETSI Publications "CTM Access Profile (CAP)"*, prETS 300824, November 1996). According to patent claim 1 of WO95/05040, this can be achieved by a DECT base station fashioned as DECT repeater. In a universal mobile telecommunication system, DECT is mainly understood as a "network access technology" for mobile communication services (see Presentation of A. Elberse, M. Barry, G. Fleming on the topic, *"DECT Data Services—DECT in Fixed and Mobile Networks"*, Jun. 17–18, 1996, Hotel Sofitel, Paris, pages 1 through 12 and Summary) and not as a network.

Figure 5:
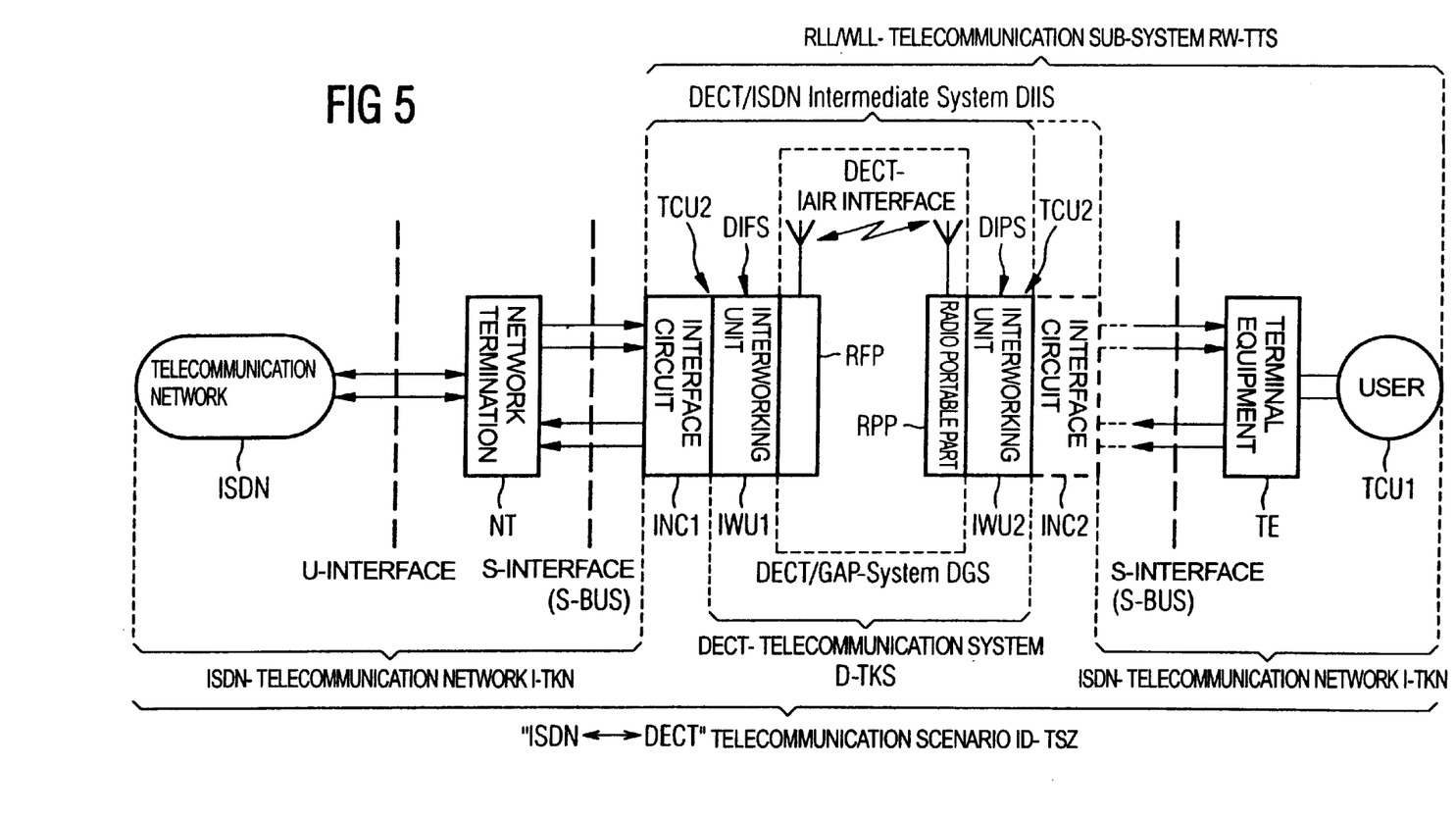
FIG. 5 shows an illustration of an ISDN-DECT telecommunication scenario with an ISDN telecommunication network.

Standing for above-presented scenario, FIG. 5—proceeding from the publications *"Nachrichtentechnik Elektronik, Berlin* 45 (1995) No. 1, pages 21 through 23 and No. 3, pages 20 and 30" as well as *IEE Colloquium* 1993, 173; (1993), pages 29/1–29/7; W. Hing, F. Halsall, *"Cordless access to the ISDN basic rate service"* on the basis of a DECT/ISDN Intermediate Systems DIIS according to *ETSI Publication prETS* 300822, February 1997—shows an ISDN⇆DECT Telecommunication scenario ID-TSZ (Integrated Services Digital Network⇆Digital Enhanced Cordless Telecommunication) with an ISDN telecommunication network I-TKN [see the publication *"Nachrichtentechnik Elektronik, Berlin* 41–43, Part: 1 through 10, P1: (1991) No. 3, pages 99 through 102; P2: (1991) No. 4, pages 138 through 143; P3: (1991) No. 5, pages 179 through 182 and No. 6, pages 219 through 220; P4: (1991) No. 6, pages 220 through 222 and (1992) No. 1, pages 19 through 20; P5: (1992) No. 2, pages 59 through 62 and (1992) No. 3, pages 99 through 102; P6: (1992) No. 4, pages 150 through 153; P7: (1992) No. 6, pages 238 through 241; P8: (1993) No. 1, pages 29 through 33; P9: (1993) No. 2, pages 65 through 97 and (1993) No. 3, pages 129 through 135; P10: (1993) No. 4, pages 187 through 190"] and a DECT telecommunication system D-TKS connected to the ISDN telecommunication network I-TKN.

As to be explained in greater detail later, the DECT telecommunication system D-TKS can thereby be a component part of a DECT/ISDN intermediate system DIIS or, respectively, of an RLL/WLL telecommunication sub-system RW-TTS. The DECT telecommunication system and, thus, the DECT/ISDN intermediate system DIIS or, respectively, the RLL/WLL telecommunication sub-system are preferably bases on a DECT/GAP system DGS as shown, for example, in FIG. 1.

Alternatively, the DECT/ISDN intermediate system DIIS or, respectively, the RLL/WLL telecommunication sub-system RW-TTS also can be based on a GSM system (Groupe Spéciale Mobile or Global System for Mobile communication; see Informatik Spektrum 14 (1991) June, No. 3, Berlin, DE; A. Mann, "Der GSM-Standard—Grundlage für europäische Mobilfunknetze", pages 137 through 152). Instead, it is also possible in the framework of a UMTS scenario that the ISDN telecommunication network I-TKN is fashioned as GSM network or as PSTN network (Public Switched Telecommunications Network).

Coming into consideration over and above this as further possibilities for the implementation of the DECT/ISDN intermediate system DIIS or, respectively, RLL/WLL telecommunication sub-system RW-TTS or of the ISDN telecommunication network I-TKN are the initially cited systems/networks that are based on the known multiple access methods FDMA, TDMA, CDMA (Frequency Division Multiple Access, Time Division Multiple Access, Code Division Multiple Access) and hybrid multiple access methods formed therefrom.

The employment of radio channels (for example, DECT channels) in classic, line-bound telecommunication systems such as the ISDN (for example, RLL/WLL scenario) is gaining in significance, particularly as viewed in front of the background of future, alternative network operators without their own complete wire network. For example, the wireless connection technology RLL/WLL (Radio in the Local Loop/Wireless in the Local Loop) given the RLL/WLL telecommunication sub-system RW-TTS, should make ISDN services available to a ISDN subscriber at standard ISDN interfaces, for example upon involvement of the DECT system DS (see FIG. 4).

In the "ISDN⇆DECT telecommunication scenario ID-TSZ of FIG. 4, a first telecommunication subscriber (user) TCU1 (Tele-Communication User) has his terminal equipment TE (Terminal Endpoint; Terminal Equipment) linked into the ISDN world with the services available therein, for example via a standardized S-interface (S-BUS), the DECT/ISDN intermediate system DIIS—preferably DECT-specific and contained in RLL/WLL telecommunication sub-system RW-TTS—fashioned as local message transmission loop, a further standardized S-interface (S-BUS), a network termination NT (Network Termination) and a standardized U-interface of the ISDN telecommunication network I-TKN, as is, on the other hand, a second telecommunication user TCU2 as ultimate user of the DECT/ISDN intermediate system DIIS.

The DECT/ISDN intermediate system DIIS is primarily composed of two telecommunication interfaces, a first telecommunication interface DIFS (DECT Intermediate Fixed System) and a second telecommunication interface DIPS (DECT Intermediate Portable System) that are wirelessly connected to one another, for example, via a DECT air interface. Due to quasi location-bound first telecommunication interface DIFS, the DECT/ISDN intermediate system DIIS forms the local message transmission loop defined above in this context. The first telecommunication interface DIFS contains a radio fixed part RFP (Radio Fixed Part), an interworking unit IWU1 (InterWorking Unit) and an interface circuit INC1 (INterface Circuitry) to the S-interface. The second telecommunication interface DIPS contains a radio portable part RPP (Radio Portable Part), and an interworking unit IWU2 (InterWorking Unit) and an interface circuit INC2 (INterface Circuitry) to the S-interface. The radio fixed part RFP and the radio portable part RPP thereby form the known DECT/GAP system DGS.

As already mentioned, FIG. 5—as typical RLL/WLL scenario—shows howthe DECT/ISDN intermediate system DIIS is linked into the ISDN telecommunication network I-TKN as local message transmission loop in the framework of the RLL/WLL telecommunication sub-system RW-TTS, and—second, how a DECT/ISDN intermediate system DIIS is connected to the ISDN telecommunication network I-TKN only at the network side from CAP points of view (Cordless terminal mobility Access Profile). In the $2^{nd}$ possibility, the interface circuit INC2 of the second telecommunication interface DIPS to the S-interface is not active or not even present at all. In order to graphically show this situation overall and substantiate it, the interface circuit INC2 of the second telecommunication interface DIPS is shown with broken lines. Whereas the second telecommunication interface DIPS in the 1$^{st}$ possibility is not fashioned, for example, mobile part-specifically, i.e. with user interface, The second telecommunication interface DIPS in the 2$^{nd}$ possibility is fashioned as typical mobile part with a user interface.

The CTM service (cordless terminal mobility) provided for the universal mobile telecommunication system (UMTS) should offer CTM subscribers of cordless terminal equipment mobility within and between nets/network (rubric:roaming). A distinction is thereby made in the CTM context between a "residential" configuration and a "public access" configuration. The term "public access" configuration means that the access for the terminal equipment into the n network occurs via public radio base stations that are completely controlled from the net/network.

Figure 6:
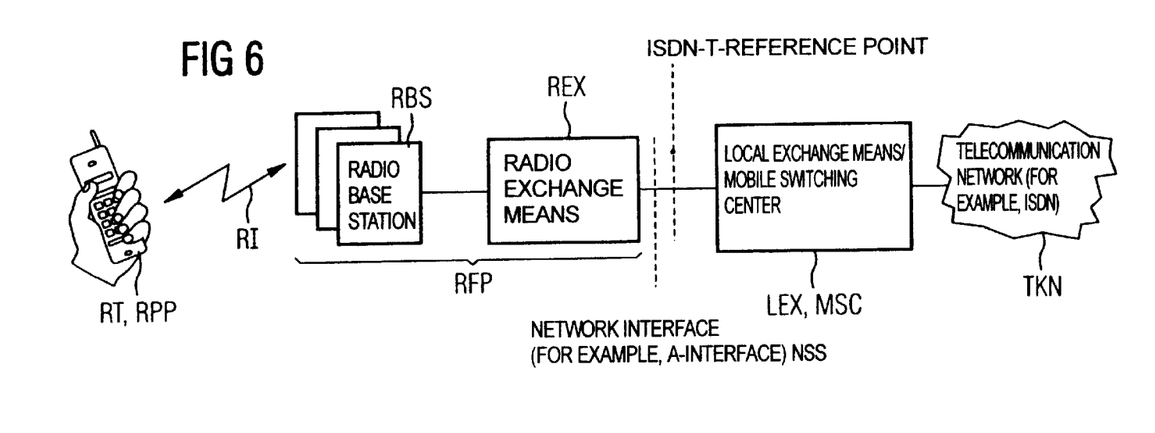
FIG. 6 shows the fundamental structure of a public access configuration.

FIG. 6 shows the fundamental structure of such a "public access" configuration, wherein mobile public radio terminal equipment RT (public radio terminal) that is referred to as radio portable part RPP according to the DECT or, respectively CTM standard, is wirelessly connected via a radio interface RI to a public radio base station RBS. The radio base station RBS or, respectively, the radio base stations RBS is/are, in turn connected via a radio exchange means REX (radio exchange) and a local exchange means LEX (local exchange) and/or a mobile switching center MSC to the telecommunication network TKN configured, for example, as an ISDN network. The radio base station/stations RBS and the radio exchange means REX are thereby referred to as radio fixed part RFP according to the DEC or, respectively, CTM standard. In this configuration, the radio fixed part RFP is connected to the public net/network via a network interface NSS, what is referred to as the α-interface (see ETSI publication DE/SPS-05121, Version 1.6, May 1997) [CETIS Technical Report TSR-TR 013, 1991]. Further, the radio base stations RBS are completely controlled by the net/network, for example, it is prescribed to them what identifiers (identities) they are to transmit via the air, such as according to the DECT standard. In public networks, the mobile radio terminal equipment RT synchronized onto the corresponding radio base stations RBS via the "public access rights" sent from the radio base station RBS can then transmit corresponding calls [CETSI publication ETS300175-6, October 1992, Chapters 4, 5 and 8].

The term "residential" configuration means, in a CTM context, that the access for radio terminal equipment into the network occurs via private base stations (residential base station). Here, the owners of the base stations have the possibility of concluding an agreement with the public network operators such that network subscribers passing by the private base station can telecommunicate into the public network with a "public subscription" at the private base stations. As a result, the cost-intensive installation of public base stations as in FIG. 6 is eliminated.

Figure 7:
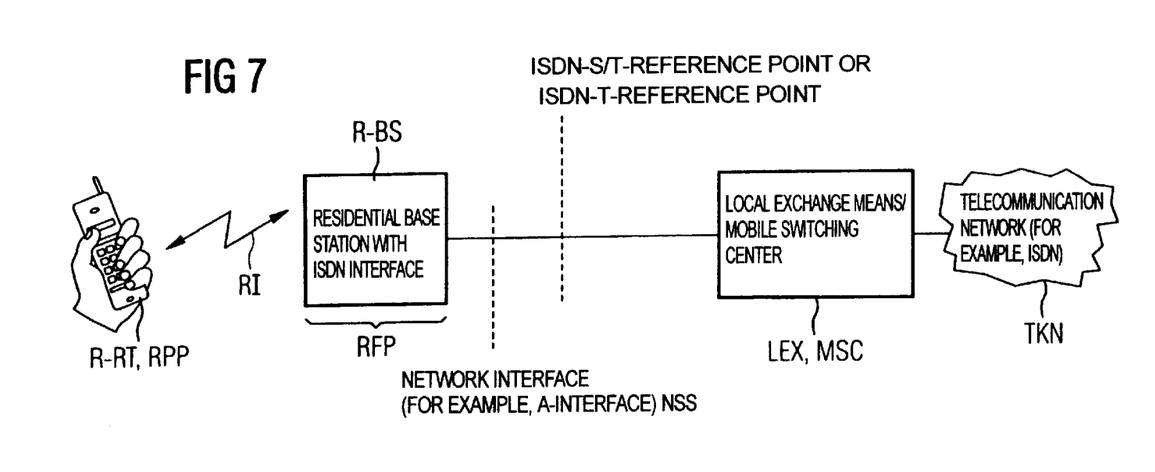
FIG. 7 shows the fundamental structure of a residential configuration.

FIG. 7 shows the fundamental structure of such a "residential" configuration, wherein mobile private radio terminal equipment R-RT (residential radio terminal) that is referred to as radio portable part RPP according to the DECT or, respectively, CTM standard is wirelessly connected via a radio interface RI to a residential base station R-BS. The residential base station R-BS is, in turn, connected via either a local exchange LEX (local exchange) or a mobile switching center MSC to the telecommunication network TKN which is configured, for example, as an ISDN network and correspondingly includes an ISDN interface. The residential base station R-BS with the ISDN interface is thereby referred to as radio fixed part RFP according to the DECT or, respectively, CTM standard. In this configuration, the radio fixed part RFP is connected via a network interface NSS, what is referred to as the α-interface [CETSI publication DE/SPS-05121, Version 1.6, May 1997] and the ISDN-S/T reference point or the ISDN-T reference point to the public net/network [CETSI Technical Report TCR-TR 013].

The technical problem, then, is that a residential base station does not transmit the "public access rights" that the radio terminal equipment RT requires for synchronization. The DECT-specific residential base station sends, for example, only the "private access rights" in the form of a PARI information (primary access rights identity) with the sub-information "ARI class A" (access rights identity) [CETSI publication ETS 300175-6, October 1992, Chapters 4, 5 and ]. Network subscribers passing by the residential base station can, therefore, never telecommunicate into the public network with a "public subscription" at the private base station.

Regarding telecommunication systems having wireless telecommunication between telecommunication devices and cooperating stations, the object of the present invention is to also be able to at least temporarily use cooperating stations with private access authorization for telecommunication devices as cooperating stations with public access authorization for telecommunication devices.

SUMMARY OF THE INVENTION

This object is achieved by the features recited in patent claim 1.

The idea underlying the present invention is that all telecommunication devices designed for public and/or private purposes, particularly given cooperating stations with private access authorizations (residential cooperating stations), in telecommunication systems of the species initially outlined with wireless telecommunication between the telecommunication devices and the cooperating stations—for example, DECT terminal devices designed for public and/or private purposes, particularly given DECT-specific residential cooperating stations in DECT systems—obtain access authorization or, respectively, become access-authorized as such the residential cooperating stations that are connectible via network interfaces to telecommunication networks fetch information (for example, DECT-specific SARI information) that is present in the telecommunication networks and indicate (signalize) the access authorization via the network interfaces and forward these to the telecommunication devices over the "air".

So that the residential cooperating stations cannot arbitrarily fetch the information indicating the access authorizations, it is advantageous to implement authentification procedures between the residential cooperating stations and the telecommunication networks. As a result of these authentification procedures, the residential cooperating stations must legitimatize themselves or, respectively, prove that they are authorized to fetch the information in the networks. Alternatively, it also is possible to manage without authentification procedures when the fetching of the information is made available to the residential cooperating stations for public accesses by telecommunication devices limited in time or unlimited in exchange for network-side performances (for example, payments of money, reduction of network usage fees, etc.) on the basis of offers of the telecommunication network operators to owners (uses) of the residential cooperating stations, this being initiated by the residential cooperating stations in the sense of accepting an offer.

A further advantage (rubric:flexibility) of the invention is that the permissions of the residential cooperating stations as cooperating stations with public access authorization can be suspended or, respectively, revoked at any time. This suspension or, respectively, the revocation can occur by the network operators, whereas, the suspension or, respectively, the revocation occurs by the owners of the residential cooperating stations.

It is advantageous according to claim 5 when the fetching of the information and the suspension or, respectively, revocation of the permissions are initiated by user-specific operating procedures at the residential cooperating stations. Given initial commissionings of the residential cooperating stations, for example, the turn-on events are provided as user-specific operating procedures.

In a further embodiment of the present method, it is advantageous for reasons of network planning on the part of the network operators and taking general fundamentals of agreements or, respectively, contract law into consideration when the suspension or, respectively, the revocation is noticed to the respectively other side.

Additional features and advantages of the present invention are described in, and will be apparent from, the Detailed Description of the Preferred Embodiments and the Drawings.

DETAILED DESCRIPTION OF THE PREFERRED EMBODIMENTS

Figure 8:
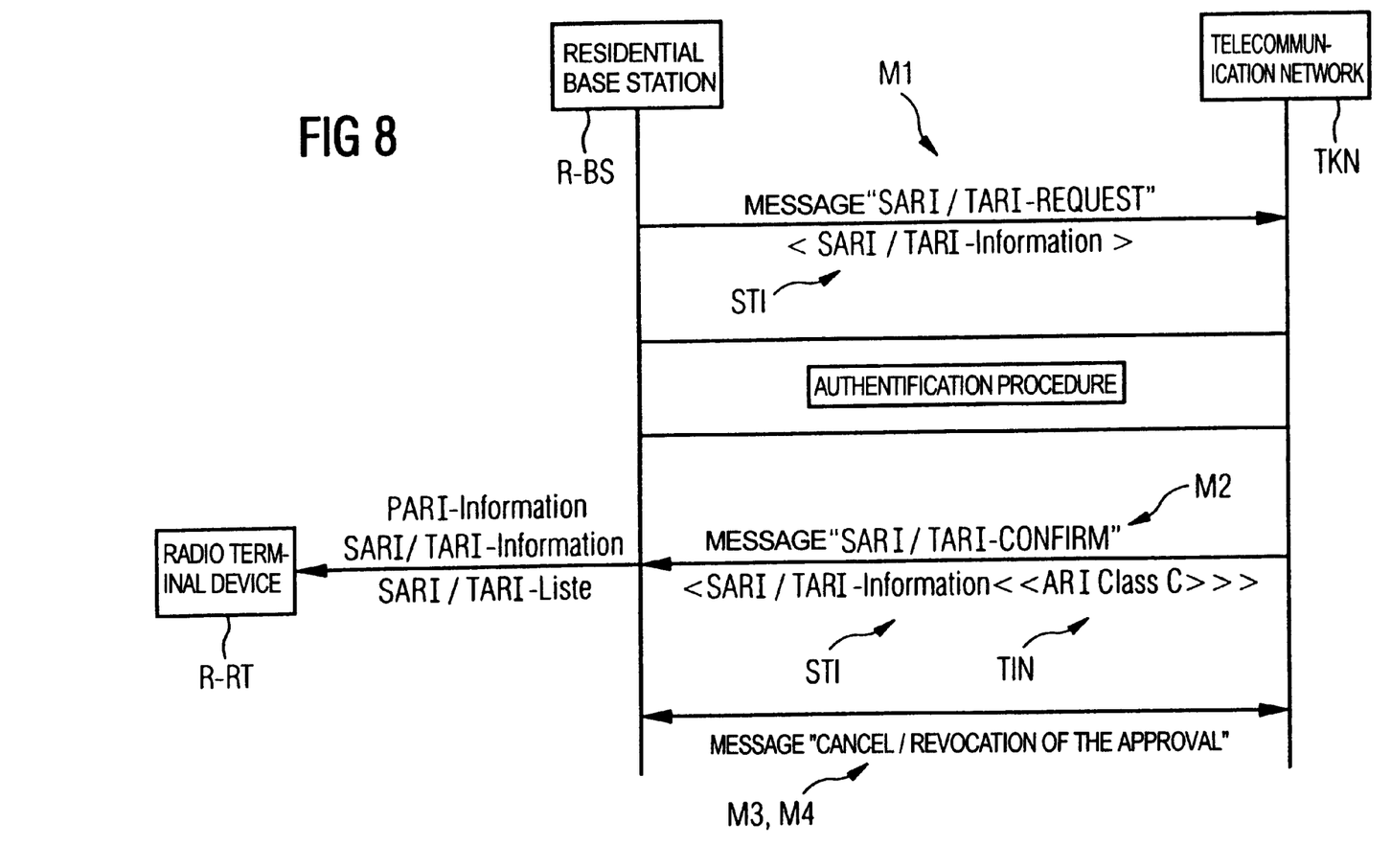
FIG. 8 shows a message flowchart between a DECT-specific residential base station of a DECT system and a public telecommunication network.

Proceeding from FIG. 7, FIG. 8 shows a message flow chart between a DECT-specific residential base station R-BS of a DECT system and a public telecommunication network TKN. The residential base station R-BS transmits an initial message "SARI/TARI-REQUEST" M1 (secondary/tertiary access rights identity) via the network interface NSS, what is referred to as the α-interface, to the public telecommunication network TKN for requesting a system-specific SARI/TARI information STI-TIN according to the DECT standard [ETSI publication ETS 300175-6, October 1992, Chapters 4, 5 and 8]. After this, an authentification procedure between the residential base station RBS and the public telecommunication network TKN can be implemented optionally via the network interface. With this procedure, the residential base station R-BS must legitimize itself at the telecommunication network TKN in the sense of the aforementioned agreement that was concluded. Following thereupon after potentially successful authentification, the telecommunication network TKN sends a second message "SARI/TARI-CONFIRM" M2 as answer to the first message M1 via the network interface NSS to the residential base station R-BS. With this second message M2, the residential base station R-BS has the system-specific SARI/TARI information STI with a sub-information "ARI Class C" TIN made available to it [CETSI publication ETS 300175-6, October 1992, Chapters 4, 5 and 8].

Dependent on what kind of a telecommunication network TKN the telecommunication network TKN is, other sub-information "ARI Class B" or "ARI Class D" can also be contained in the SARI/TARI information STI [CETSI publication ETS 300175-6, October 1992, Chapters 4, 5 and 8].

Over and above this, when the telecommunication network TKN with the telecommunication system wirelessly allocated to this network is contractually bound to another telecommunication network TKN with other wireless telecommunication systems allocated thereto, a plurality of system-specific SARI/TARI information with the sub-information "ARI Class B", "ARI Class C" and/or "ARI Class D" respectively differing on the basis of supplementary information also can be transmitted.

After reception of the SARI/TARI information with the sub-information "ARI Class B", "ARI Class C" and/or "ARI Class D" a residential base station R-BS, in addition to the PARI information with a sub-information "ARI Class A", transmits an SARI/TARI information having the sub-information "ARI Class B", "ARI Class C" and/or "ARI Class D" or an SARI/TARI list containing a plurality of SARI/TARI information with the sub-information "ARI Class B", "ARI Class C" and/or "ARI Class D" to the mobile, private radio terminal equipment R-RT of the DECT system.

On a basis of further messages (a third message M3 and a fourth message M4A) the above-described permission of the residential base station R-BS as base station with public access authorization can, in turn, be suspended or, respectively, revoked at any time at the network side and/or at the station side.

Although the present invention has been described with reference to specific embodiments, those of skill in the art will recognize that changes may be made thereto without departing from the spirit and scope of the invention as set forth in the hereafter appended claims.

I claim:

1. A method for controlling access authorizations of telecommunication devices at cooperating stations in telecommunication systems having wireless telecommunication between the telecommunication devices and the cooperating stations, wherein residential cooperating stations with private access authorization in the telecommunication systems are connectable via network interfaces to telecommunication networks, the method comprising the steps of:

sending, via the residential cooperating stations, first information in the framework of the wireless telecommunication with first sub-information with which the residential cooperating stations reveal themselves to first telecommunication devices as cooperating stations with private access authorization;

transmitting, via the residential cooperating stations, first messages via the network interfaces into the telecommunication networks;

requesting, via the residential cooperating stations, second information with second sub-information from the network operators of the telecommunication networks;

transmitting as a reply, via the network operators of the telecommunication networks, second messages via the network interfaces to the residential cooperating stations;

transmitting, via the residential cooperating stations, the second information with the second sub-information;

sending, via the residential cooperating stations in the framework of the message transmission, the second information with the second sub-information; and legitimizing the residential cooperating stations to second telecommunication devices either within the telecommunication system or outside the telecommunication system as cooperating stations with public access authorization.

2. A method for controlling access authorizations of telecommunication devices at cooperating stations in telecommunication systems having wireless telecommunication between the telecommunication devices and the cooperating stations as claimed in claim 1, the method further comprising the step of:

authenticating the residential cooperating stations at the network operators with network interface-specific authentification procedures after the transmission of the first messages and before the transmission of the second messages.

3. A method for controlling access authorizations of telecommunication devices at cooperating stations in telecommunication systems having wireless telecommunication between the telecommunication devices and the cooperating stations as claimed in claim 1, the method further comprising the step of:

transmitting third messages from the telecommunication networks to the residential cooperating stations so as to revoke the permissions received by the residential cooperating stations with the reception of the second messages from the telecommunication networks to reveal themselves as cooperating stations with public access authorization for the second telecommunication devices.

4. A method for controlling access authorizations of telecommunication devices at cooperating stations in telecommunication systems having wireless telecommunication between the telecommunication devices and the cooperating stations as claimed in claim 1, the method further comprising the step of:

transmitting fourth messages from the residential cooperating stations to the telecommunication networks to suspend at a station side by the users of the residential cooperating stations the permission received by the residential cooperating stations with the reception of the second messages from the telecommunication networks to reveal themselves as cooperating stations with public access authorization for the second telecommunication devices.

5. A method for controlling access authorizations of telecommunication devices at cooperating stations in telecommunication systems having wireless telecommunication between the telecommunication devices and the cooperating stations as claimed in claim 4, the method further comprising the step of:

initiating the transmission of the first messages and the fourth messages by user-specific operating procedures at the residential cooperating stations.

6. A method for controlling access authorizations of telecommunication devices at cooperating stations in telecommunication systems having wireless telecommunication between the telecommunication devices and the cooperating stations as claimed in claim 3, the method further comprising the step of:

transmitting supplementary information to a respective other side with which an intention of suspending the permissions is noticed via the users of the residential cooperating stations and the network operators.

7. A method for controlling access authorizations of telecommunication devices at cooperating stations in telecommunication systems having wireless telecommunication between the telecommunication devices and the cooperating stations as claimed in claim 1, wherein the telecommunication systems are DECT systems, the cooperating stations are DECT base stations, and the telecommunication devices are DECT mobile parts and DECT network termination assemblies with allocated, wire-bound terminal equipment as user interfaces.

8. A method for controlling access authorizations of telecommunication devices at cooperating stations in telecommunication systems having wireless telecommunication between the telecommunication devices and the cooperating stations as claimed in claim 1, wherein the telecommunication networks are ISDN networks and the network interfaces are ISDN-specific α-interfaces.

9. A method for controlling access authorizations of telecommunication devices at cooperating stations in telecommunication systems having wireless telecommunication between the telecommunication devices and the cooperating stations as claimed in claim 1, wherein the telecommunication networks are at least one of PSTN networks, GSM networks and hybrid networks with respect to CDMA/FDMA/TDMA multiple access methods, and the network interfaces are at least one of PSTN-specific network interfaces, GSM-specific network interfaces and specific network interfaces with respect to the hybrid networks.

10. A method for controlling access authorizations of telecommunication devices at cooperating stations in telecommunication systems having wireless telecommunication between the telecommunication devices and the cooperating stations as claimed in claim 1, wherein the telecommunication systems are GSM systems, the cooperating stations are RGSM base stations with allocated, central switching devices, and the telecommunication devices are at least one of GSM mobile parts and GSM network terminal assemblies with allocated, wire-bound terminal equipment as user interfaces.

11. A method for controlling access authorizations of telecommunication devices at cooperating stations in telecommunication systems having wireless telecommunication between the telecommunication devices and the cooperating stations as claimed in claim 1, wherein the telecommunication systems are hybrid systems with respect to the CDMA/FDMA/TDMA multiple access methods, the cooperating stations are hybrid base stations, and the telecommunication devices are at least one of hybrid mobile parts and hybrid network termination assemblies having allocated, wire-bound terminal equipment as user interfaces.

12. A method for controlling access authorizations of telecommunication devices at cooperating stations in telecommunication systems having wireless telecommunication between the telecommunication devices and the cooperating stations as claimed in claim 6, wherein the first information is DECT-specific PARI information, the second information is at least one of DECT-specific SARI information and TARI information, the first sub-information contains ARI Class A data and potentially contains telecommunication-system-specific data, and the second sub-information contains at least one of ARI Class B data, ARI Class C data and ARI Class D data and potentially contains telecommunication-system-specific data.

13. A method for controlling access authorizations of telecommunication devices at cooperating stations in telecommunication systems having wireless telecommunication between the telecommunication devices and the cooperating stations as claimed in claim 12, wherein the first messages are network interface-specific messages "SARI/TARI-REQUEST" and the second messages are "SARI/TARI-CONFIRM" messages.

* * * * *